April 7, 1925.
E. W. BURGESS
TRACTOR OPERATED IMPLEMENT
Original Filed Aug. 6, 1915
1,533,058
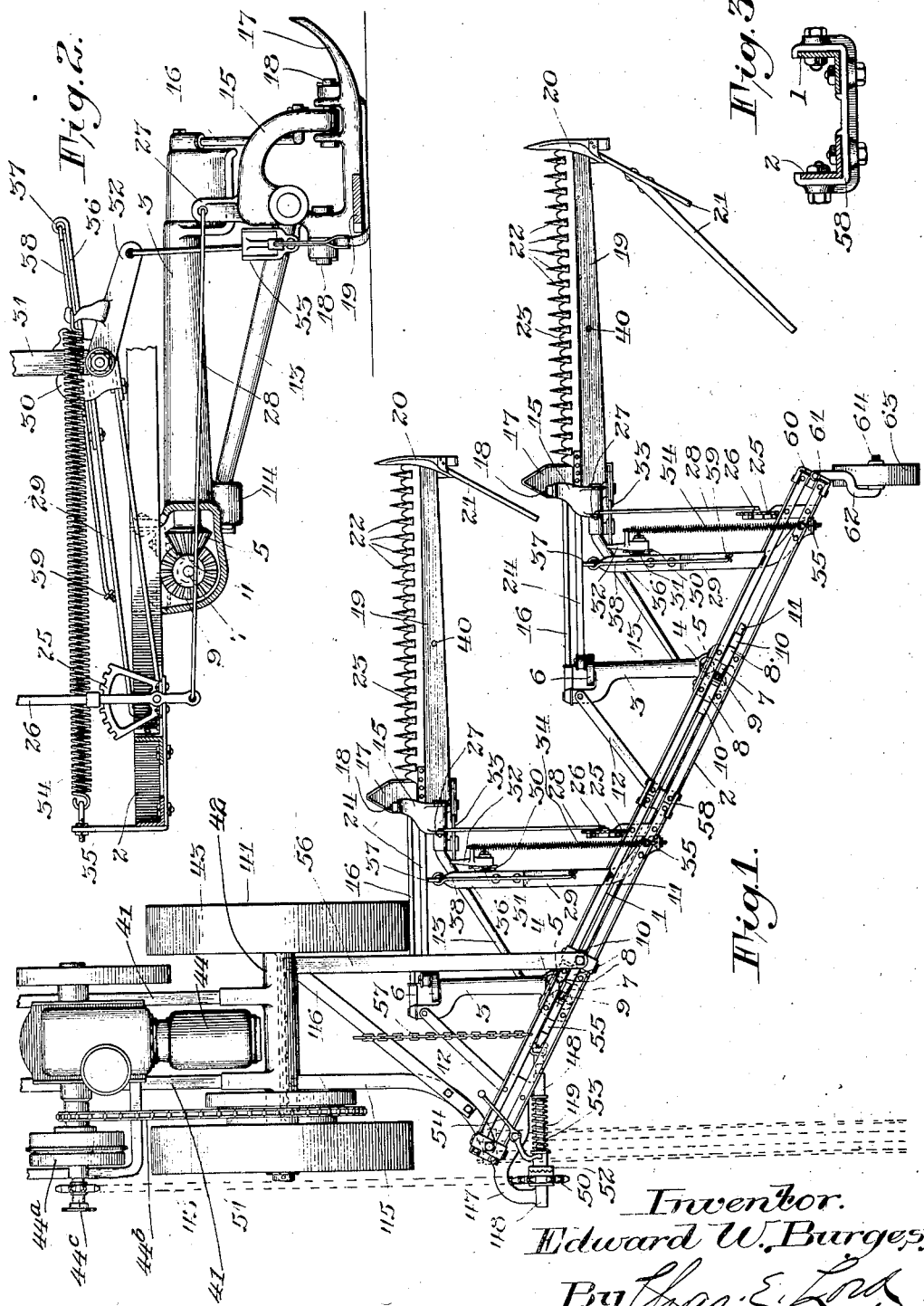
Inventor.
Edward W. Burgess,
By Chas. E. Lord
Atty.

Patented Apr. 7, 1925.

1,533,058

UNITED STATES PATENT OFFICE.

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

TRACTOR-OPERATED IMPLEMENT.

Application filed August 6, 1915, Serial No. 44,049. Renewed November 1, 1919. Serial No. 335,105.

*To all whom it may concern:*

Be it known that I, EDWARD W. BURGESS, a citizen of the United States, residing at Chicago, in the county of Cook and State of Illinois, have invented certain new and useful Improvements in Tractor-Operated Implements, of which the following is a full, clear, and exact specification.

My invention relates to tractor operated implements, and in particular to harvesting machinery, such as mowers, harvesters or the like.

It has among its objects to produce an improved unitary construction which may be rigidly attached to a power unit; as, for instance, a tractor, in such a manner as to transform the tractor into a power driven implement.

A further object of my invention is to produce an improved mechanism which may be of any desired size, preferably comprising a plurality of operatively connected harvester units which may be connected to a source of power; as, for instance, a tractor, and drawn thereby, the power for the harvesting mechanisms on the units preferably also being derived from the tractor.

A further object of my invention is to provide a mechanism of the character set forth above having maximum capacity, in which the number of parts is reduced to the minimum, and the cost of manufacture is correspondingly reduced.

These objects are obtained by means of mechanisms, one embodiment of which, wherein my improvement is used in connection with mowers, being shown for purposes of illustration in the accompanying drawings.

In these drawings:

Figure 1 is a top plan view of a tractor equipped with my improvement, two operative sections thereof being shown;

Figure 2 is a sectional side elevation on an enlarged scale of a part of Figure 1;

Figure 3 is a cross section of the frame member illustrating the means whereby the machine frames are connected.

In the construction illustrated, 1 and 2 represent diagonally disposed front and rear members, respectively, of the main frame of a mowing machine unit having a tubular frame member 3 secured thereto that is disposed in a fore and aft direction, and journaled therein is a shaft 4 having a bevel pinion 5 secured to its rear end and a crank wheel 6 to its opposite end. 7 represents a shaft having its opposite ends journaled in bearings 8, preferably integral with the frame member 3, and having a bevel pinion 9 secured thereto and meshing with the pinion 5. Secured to opposite ends of the shaft 7 are coupling sleeves 10 adapted to operatively receive the ends of the disconnectible driving shafts 11. 12 represents a diagonally disposed frame member connecting the front end of the member 3 with the member 1. 13 represents a common form of coupling frame member having its rear end journaled in a bearing block 14 integral with the rear end of the tubular frame member 3. As shown, this coupling frame member extends forward and grassward and is turned laterally at right angles with the line of draft of the machine. Journaled on its grassward end is a common form of coupling yoke 15. 16 represents a supplemental coupling frame member connecting the front end of the yoke 15 with the front end of the frame member 3. 17 represents the inner shoe of the cutting apparatus pivotally connected with the yoke 15 in the usual way by means of pins 18, and having a cutter bar 19 secured thereto, the opposite end of the bar being equipped with a common form of shoe 20 and swather members 21. 22 represents the guard fingers, 23 the sickle, and 24 the pitman connecting the sickle with the crank wheel 6. 25 represents a toothed sector carried by the frame members 1 and 2. Operatively mounted on these members is a detent controlled tilting lever 26 having its lower end connected with an arm 27 integral with the yoke 15 by means of a rod 28 whereby the yoke may be turned about its axis in a manner to tilt the cutter bar in opposite directions in a common way. 29 represents a forwardly extending bracket member having its rear end secured to the frame members 1 and 2, and its front end adapted to receive a bearing sector 30, upon which is pivotally mounted a detent controlled lifting lever 31, which has its forwardly extending arm 32 flexibly connected with the cutting apparatus by means of a common form of link and lever mechanism 33, a counterbalancing spring 34 connecting the lifting lever with the upturned end 35 of the rear end of the bracket 29. 36 represents a forwardly extending bar secured to the front end of the bracket 29, and having an eye member 37 at its front end whereby it is flexibly connected with one end of a rod 38, having its opposite end provided with a securing nut 39 and adapted to be received by an opening 40 in the cutter bar when said bar is raised to a vertical position for transportation purposes in the usual way.

The power unit with which I combine my unitary construction to form a power driven implement is shown as a tractor of the four-wheel type, the front or steering wheels being omitted because of insufficient room. The tractor has two side frame bars 41, 41 connected at their rear ends to the axle housing 42 supported on the drive wheels 43. The engine 44 is carried by the bars 41 and drives the traction wheels 43 through the transmission 44ᵃ and chain 44ᵇ. The operating parts of the implement are driven from a power take-off shaft 44ᶜ which is driven from the transmission as shown in my co-pending Patent No. 1,301,811. A rearwardly extending draft bar 45 is secured to the draw bar or axle housing 42 and is supported laterally by the diagonal brace 46. Secured to the front ends of the frame members 1 and 2 of what may be termed the initial or tractor unit of the machine, is a gear frame member 47 carrying bearing boxes 48, in which is journaled a cross shaft 49, upon which is journaled a sprocket wheel 50 that may be operatively connected with a moving part of the tractor mechanism, as by means of a driving chain 51. 52 represents a slidable clutch member secured to the shaft in a manner to transmit rotation thereto and adapted to normally engage with the sprocket wheel 50 under the reactive force of a coiled compression spring 53 encircling the shaft and operative between one of the bearing boxes 48 and the slidable clutch member, and 54 represents a clutch shipping lever pivotally mounted upon the gear frame and operative to control the position of the slidable clutch member. The grassward end of the cross shaft 49 is operatively connected with the adjacent end of the shaft 7 by means of a universal coupling mechanism 55. The front end of the frame of the tractor unit carrying the gear frame member 47 is pivotally connected with the rear end of the draft bar 45, and 56 represents a supplemental draft bar disposed parallel with the bar 45 and connecting the opposite end of the draw bar 42 with the frame of the tractor unit in a manner to rigidly connect it with the tractor when it is in an operative position and moving forward or turning at the corners, the rear end of this supplemental draft bar being so connected to the frame of the tractor unit frame that the latter may swing to a trailing position, as shown by dotted lines in Figure 1. 57 represents a chain connection between the frame of the mower section and the tractor adapted to sustain the weight of the mower frame. The second mower unit is substantially the same as the tractor unit without the gear frame member 47, and the frame bars 1 and 2 are connected by means of a joining member 58, the opposite ends of the driving shaft 11 operatively engaging with the coupling sleeves 10 in a manner to transmit motion from the tractor unit to the second unit. 60 represents a bracket member secured to the rear end of the frame bars 1 and 2 of the second unit, and provided with a vertically disposed sleeve 61, in which is journaled the vertical stem of a caster wheel supporting arm 62, having a wheel 63 journaled upon its lower laterally turned axle member 64.

The machine may include as many units as desired, one, two, three, or more units like the second, if desirable, being connected by means of joining members 58, the caster wheel supporting arm being in each case preferably secured to the grassward ends of the frame bars of the rear unit. Obviously, by suitably proportioning the joining members 58 and the slidable power connections, units having cutter bars of different lengths may also be used if desired. The coupled units form a continuous rigid frame in lineal relation that is carried as one piece with the tractor and is bodily removable, if desired. A single source of power transmits motion to the several cutting units. The cutter bars are free to rise and fall and be tilted independently, and are spaced apart in the direction of the line of draft sufficiently to permit the cut grass to fall and the swathers to perform their function. It will also be noted that the cutter bars may be raised and secured in a vertical position, and that the machine may then be trailed directly behind the tractor by disconnecting the draft bar 56 and chain 57. When the machine is in trailing position, the shaft 49 and sprocket 50 will pivot with the frame member 47 about the pivotal connection of the frame member with the draft bar 45. In this position, the drive chain 51 becomes slack and may be removed from the drive sprocket on the shaft 42. Of course, when in cutting position, the power connections may be controlled by the lever 54.

Having shown and described one embodiment of my invention, I do not wish that it be confined to the specific details of construction, it being understood that changes may be made in the organization and proportion of its parts, for example, as shown in the patent granted to me January 14, 1919 No. 1,291,393, without departing from the spirit and scope of the invention as indicated in the appended claims.

What I claim as my invention, and desire to secure by Letters Patent, is:

1. A cutting apparatus for harvesters or mowers comprising a frame made up of separately detachable frame sections, a cutting mechanism including a finger bar connected to and removable from the remainder of the frame with each of said sections, and means for independently connecting said cutting mechanism to a common source of power.

2. A multiple unit cutting apparatus for harvesters and mowers comprising a frame made up of a plurality of separately detachably connected frame sections, a unitary cutting mechanism including a finger bar carried by each of said sections and removable from the remainder of the frame with its corresponding frame section, and means for independently operatively connecting each of said cutting mechanisms to a common source of power.

3. In a machine of the class described, a supporting frame built up of aligned sections, a power transmitting member built up of aligned sections and supported by the frame, and cutting units attached to corresponding sections of said frame and being operatively connected to corresponding sections of the power transmitting member whereby complete units may be added to or taken from the combined machine to make it larger or smaller.

4. In a machine of the class described, a supporting frame built up of sections, a power transmitting member built up of sections and supported by the frame, and cutting units floatingly attached to corresponding sections of the frame and being operatively connected to corresponding sections of the power transmitting member whereby complete units may be added to or taken from the combined machine to make it larger or smaller.

5. In a machine of the class described, a supporting frame built up of sections, a power transmitting member built up of sections and supported by the frame, and cutting units attached to corresponding sections of the frame and being operatively connected to corresponding sections of the power transmitting member whereby complete units may be added to or taken from the combined machine to make it larger or smaller.

6. A cutting apparatus for harvesters or mowers comprising a frame made up of separately detachable sections, a cutting mechanism supported on each of said sections, means whereby said frame may be attached to a power unit and removed bodily therefrom, and means including separate power transmitting members for connecting each of said cutting mechanisms to a common source of power.

7. A cutting apparatus for harvesters or mowers comprising a frame having separately detachable longitudinally aligned sections, a cutting mechanism disposed on each one of said sections and extending forwardly therefrom in offset relation, and means whereby said frame may be attached to a power unit or removed bodily therefrom.

8. In combination, a tractor, a frame connected thereto and normally disposed sidewardly and rearwardly with respect to the line of draft, cutting mechanism supported on and extending from said frame at an angle with respect thereto, and means whereby said frame may be trailed directly in rear of said tractor.

9. A cutting apparatus for harvesters or mowers comprising a frame having longitudinally aligned separately detachable sections, a cutting mechanism connected to each of said sections said mechanism being disposed in offset relation with respect to each other, and means whereby said cutting mechanisms may be independently adjusted.

10. In a machine of the class indicated, two or more supported sectionally connected frames, operative elements connected thereto for a rising and falling movement, means for detachably connecting said frames end to end in lineal relation and means for driving said operative elements from a common source of power.

11. In a harvesting machine, a frame comprising separable sections secured in lineal relation with respect to each other and inclined relative to the line of draft, adjustable crop cutting elements carried thereon in offset relation and means for vertically adjusting said elements on said frame.

12. In a machine of the class indicated, two or more sectionally connected frames carrying crop cutting elements having a rising and falling action relative thereto, means for connecting said frames end to end in lineal relation, and a common source of tractive and driving power for transmitting motion to the operative parts of the machine.

13. In combination a traction engine, a separate unit propelled thereby and including a plurality of cutting means disposed in offset relation with respect to each other and at one side of the path of travel of said engine, and unitary power transmission means connecting said cutting means with said engine.

14. A harvesting machine including a traction engine, a draft frame, means for connecting said frame with said traction engine, and a plurality of cutting elements carried by said frame in offset relation, said frame connecting means being adapted to retain said frame in either operative or trailing relation with said engine.

15. In combination, a source of tractive and driving power, a sectional power transmitting member associated therewith, and cutting apparatus arranged in sections and operatively connected to said power transmitting member whereby the sections may be added or withdrawn as units.

16. In combination, a tractor, a draft frame attached thereto and disposed diagonally with respect thereto, a plurality of cutting mechanisms attached to said frame and disposed in offset relation with respect to each other, and means whereby said frame may be trailed directly in rear of said tractor.

17. A unitary cutting apparatus comprising a rigid frame disposed diagonally relative to the line of draft, a plurality of cutting mechanisms attached thereto, driving mechanism therefor carried on said frame and driven from one end thereof, and a supporting wheel carried at the opposite end of said frame.

18. In combination, a tractor, a frame rigidly connected thereto, a unit pivotally connected to said frame and normally disposed transversely relative to the line of draft, cutting mechanism on said unit, power mechanism therefor carried on said frame and connected to said tractor, and means whereby said unit may be swung into trailing relation relative to said tractor.

19. In combination, a tractor, a frame rigidly connected thereto, a unit pivotally connected to said frame and normally disposed transversely relatively to the line of draft, cutting mechanism arranged in sections on said unit, power mechanism therefor carried on said frame and connected to said tractor, and means on said frame for controlling the connection of said power mechanism.

20. A unitary cutting apparatus for harvesters or mowers comprising a diagonally disposed sectional frame, a plurality of cutting mechanisms arranged in sections disposed in offset relation with respect to each other and rigidly connected to said frame, and a single driving means disposed longitudinally of said frame and operatively connected to said mechanisms.

21. In combination, a source of tractive and driving power, a sectional frame connected thereto inclined laterally and rearwardly relative to the line of draft, a sectional driving shaft carried by said frame disposed at a like angle and operatively connected with the source of driving power, and cutting units carried by said frame and deriving motion from said shaft.

22. In combination, a source of tractive and driving power, a sectional frame connected thereto inclined laterally and rearwardly relative to the line of draft, a driving shaft carried by said frame disposed at a like angle and operatively connected with the source of driving power, cutting units carried by said frame and deriving motion from said shaft, and means whereby additional similar units may be operatively connected with said frame and shaft in off-set and lineal relation.

23. In combination, a tractor, a frame connected thereto and disposed diagonally with respect to the line of draft, a plurality of cutting mechanisms attached to said frame and disposed in off-set relation with respect to each other, and a power shaft parallel to the diagonal frame and driven from the tractor for driving said cutting mechanisms.

24. In combination, a tractor, a frame connected thereto and disposed diagonally with respect to the line of draft, a plurality of separately detachable cutting mechanisms attached to said frame and disposed in off-set relation with respect to each other, a plurality of shaft sections carried by the diagonal frame, driven from the tractor and adapted to drive the several cutting mechanisms.

25. In combination, a tractor, a diagonally disposed member connected to said tractor, a plurality of independent cutting units operatively connected to said member and disposed in offset relation with respect to each other, a power shaft driven from the tractor for driving said cutting units, and a single clutch mechanism for controlling said shaft.

26. In combination, a tractor, a frame detachably connected to the tractor and diagonally disposed with respect to the line of draft, a power shaft carried by the frame and detachable therewith, a cutting mechanism supported from the frame, driving connections between the tractor and power shaft, and driving connections between the power shaft and cutting mechanism.

27. In combination, a tractor, a diagonally disposed member connected to said tractor, a plurality of independent cutting units operatively connected to and supported in advance of said member, and disposed in off-set relation with respect to each other, and means parallel to the diagonal member and driven from the tractor for driving the cutting units.

28. In combination, a tractor, a diagonally disposed member connected to said tractor, a plurality of independent units connected thereto and each having a cutting mechanism adapted to swing in a plane at right angles to the line of draft, independent means for swinging said mechanisms in said plane, and means parallel to the diagonal member and driven from the tractor for driving the cutting mechanisms.

29. In combination, a tractor, a frame hingedly connected thereto and disposed diagonally with respect to the line of draft, cutting mechanisms disposed in off-set relation with respect to each other, a power driven shaft positioned parallel to said frame and operatively connected to said cutting mechanisms for driving same.

30. In combination, a source of tractive and driving power, a main power transmitting member connected thereto and positioned diagonally with respect to the line of draft, a plurality of supplemental power transmitting members operatively connected to said first named member, and cutting apparatus connected to said last named members and operatively driven thereby.

31. In combination, a source of tractive and driving power, a main power transmitting member connected thereto and positioned diagonally with respect to the line of draft, a plurality of supplemental power transmitting members operatively connected to and extending forwardly from said first named member, and cutting apparatus connected to said last named members and operatively driven thereby.

32. In combination, a tractor, a frame hingedly connected thereto and disposed diagonally with respect to the line of draft, cutting mechanisms disposed in off-set relation with respect to each other, a power driven shaft positioned parallel to said frame, a plurality of supplemental shafts geared to said power driven shaft and operatively connected to said cutting mechanisms for driving same.

33. In combination, a tractor, a frame hingedly connected thereto and disposed diagonally with respect to the line of draft, cutting mechanisms disposed in off-set relation with respect to each other, a power driven shaft positioned parallel to said frame, a plurality of supplemental shafts parallel to each other and geared to said power driven shaft and operatively connected to said cutting mechanisms for driving same.

34. In combination, a tractor, a diagonally disposed frame connected to the tractor, a plurality of cutting mechanisms operatively connected to said frame and disposed in offset relation, means for driving the cutting mechanisms from the tractor, and means for independently raising each cutting mechanism.

35. In combination, a tractor, a diagonally disposed frame connected to the tractor, a plurality of cutter bars pivotally connected at one end to the frame and disposed in offset relation, a shaft mounted on the frame and connected to drive the cutter bars, means for driving the power shaft from the tractor, and means for tilting one of the cutter bars to vertical position about its pivotal connection and securing it in raised position.

36. In a device of the class described, the combination of a tractor having an engine, a frame secured at one end to the tractor and extending laterally and rearwardly therefrom, a laterally extending mower bar supported on the frame, and driving connections between the mower bar and engine.

37. In a device of the class described, the combination of a tractor having an engine, a frame secured at one end to the tractor and extending laterally and rearwardly therefrom, a shaft mounted on the frame and driven from the engine, a laterally extending mower bar carried by the frame, and driving connections between the shaft and mower bar.

38. In a device of the class described, the combination with a tractor having an engine, of a frame, means for securing one end of the frame to the tractor, the frame extended laterally and rearwardly from the securing means, a laterally extending mower bar secured to the frame and adapted to travel a path parallel to the tractor, and driving connections between the mower bar and engine.

39. In a device of the class described, the combination with a tractor having an engine, of a frame, means for securing one end of the frame to the tractor, the frame extended laterally and rearwardly from the securing means, a laterally extending mower bar secured to the frame and adapted to travel a path parallel to the tractor, and means supported on the frame for driving the mower bar from the engine.

In testimony whereof I affix my signature.

EDWARD W. BURGESS.